(12) United States Patent
Zou et al.

(10) Patent No.: US 11,869,392 B2
(45) Date of Patent: Jan. 9, 2024

(54) DISPLAY PANEL, PREPARATION METHOD AND DRIVING METHOD THEREOF, AND DISPLAY APPARATUS

(71) Applicants: Beijing BOE Optoelectronics Technology Co., Ltd., Beijing (CN); BOE Technology Group Co., Ltd., Beijing (CN)

(72) Inventors: Haowei Zou, Beijing (CN); Xiang Li, Beijing (CN); Wei He, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 171 days.

(21) Appl. No.: 17/409,826

(22) Filed: Aug. 24, 2021

(65) Prior Publication Data
US 2022/0093017 A1 Mar. 24, 2022

(30) Foreign Application Priority Data
Sep. 24, 2020 (CN) .......................... 202011019594.2

(51) Int. Cl.
*H04N 13/32* (2018.01)
*G09F 9/37* (2006.01)
*H04N 13/359* (2018.01)

(52) U.S. Cl.
CPC ............. *G09F 9/372* (2013.01); *H04N 13/32* (2018.05); *H04N 13/359* (2018.05)

(58) Field of Classification Search
USPC ......................................................... 348/51
See application file for complete search history.

(56) References Cited

U.S. PATENT DOCUMENTS

| 2018/0121002 A1* | 5/2018 | Kim ....................... H10K 59/40 |
| 2021/0234129 A1* | 7/2021 | Zhang ................. H10K 50/8445 |
| 2021/0408475 A1* | 12/2021 | Moon ................... H10K 59/122 |

* cited by examiner

*Primary Examiner* — Mikhail Itskovich
(74) *Attorney, Agent, or Firm* — Ling Wu; Stephen Yang; Ling and Yang Intellectual Property

(57) ABSTRACT

Provided are a display substrate, a preparation method and a driving method thereof, and a display apparatus. The display substrate includes a circuit substrate, a plurality of elastic electrode pillars disposed on the circuit substrate, and a plurality of second addressing electrodes and a plurality of light-emitting elements disposed on the elastic electrode pillars, the circuit substrate includes an addressing circuit and a plurality of first addressing electrodes, wherein the addressing circuit is configured to provide a first electrostatic voltage to the first addressing electrodes and a second electrostatic voltage to the second addressing electrodes; the first electrostatic voltage and the second electrostatic voltage are configured to control the deflection angle of the elastic electrode pillar.

13 Claims, 11 Drawing Sheets

DISPLAY PANEL, PREPARATION METHOD AND DRIVING METHOD THEREOF, AND DISPLAY APPARATUS

CROSS-REFERENCE RELATED APPLICATION

The present application claims the priority of Chinese Patent Application No. 202011019594.2 filed to the CNIPA on Sep. 24, 2020, the content of which is hereby incorporated by reference.

TECHNICAL FIELD

Embodiments of the present disclosure relate to, but are not limited to, the field of display technologies, in particular to a display substrate, a preparation method and a driving method thereof, and a display apparatus.

BACKGROUND

The main principle of 3D display technology is to have the left eye and right eye of a viewer to receive different images. The left and right eye images are analyzed and overlapped by human brain for the viewer to perceive the layering of the image that produces a stereoscopic impression. Among them, 3D naked eye display technology is the research hotspot of 3D display technologies.

SUMMARY

The following is a summary of subject matter described in detail in the present disclosure. This summary is not intended to limit the protection scope of the claims.

An embodiment of the present disclosure provides a display substrate, including a circuit substrate, a plurality of elastic electrode pillars disposed on the circuit substrate, and a plurality of second addressing electrodes and a plurality of light-emitting elements disposed on the plurality of elastic electrode pillars, wherein: the circuit substrate includes an addressing circuit and a plurality of first addressing electrodes, wherein the addressing circuit is configured to provide a first electrostatic voltage to the first addressing electrodes and a second electrostatic voltage to the second addressing electrodes; the first electrostatic voltage and the second electrostatic voltage are configured to control a deflection angle of the elastic electrode pillars.

In an exemplary embodiment, at least one of the plurality of elastic electrode pillars corresponds to n first addressing electrodes symmetrically distributed around the corresponding elastic electrode pillars, where n is a natural number greater than or equal to 4.

In an exemplary embodiment, the a plurality of light-emitting elements are disposed in an array along a first direction and a second direction, the first direction and the second direction intersect; the intervals between two adjacent light-emitting elements along the first direction are equal, and the intervals between two adjacent light-emitting elements along the second direction are equal.

In an exemplary embodiment, an elastic electrode pillar include first elastic electrode pillars, first elastic insulating layers wrapping the first elastic electrode pillar, a second elastic electrode pillar wrapping the first elastic insulating layer and a second elastic insulating layer wrapping the second elastic electrode pillar; a light-emitting element includes a first electrode and a second electrode, wherein the first elastic electrode pillar is connected to the first electrode, and the second elastic electrode pillar is connected to the second electrode.

In an exemplary embodiment, a height of the first elastic electrode pillar is smaller than a height of the second elastic electrode pillar.

In an exemplary embodiment, the first electrode is disposed on the top of the first elastic electrode pillar and is fixedly connected to the first elastic electrode pillar through conductive adhesive, and the second electrode is disposed on the top of the second elastic electrode pillar and is fixedly connected to the second elastic electrode pillar through conductive adhesive.

In an exemplary embodiment, the second addressing electrode includes a vertical part and a horizontal part, and the vertical part wraps the second elastic insulating layer; one end of the vertical part is connected to the addressing circuit and the other end is connected to the horizontal part; the horizontal part includes a first opening exposing the first elastic electrode pillar and the second elastic electrode pillar; and an insulating layer is provided between the light-emitting element and the horizontal part.

In an exemplary embodiment, the first elastic electrode pillar and the first electrode are anodes, and the second elastic electrode pillar and the second electrode are cathodes; or, the first elastic electrode pillar and the first electrode are cathodes, and the second elastic electrode pillar and the second electrode are anodes.

In an exemplary embodiment, the light-emitting element is a Mini-LED chip, a Micro-LED chip, an organic light-emitting diode or a quantum dot light-emitting diode.

An embodiment of the present disclosure further provides a display apparatus, including the display substrate as described in any one of the above.

An embodiment of the present disclosure also provides a preparation method for a display substrate, including:
  forming a circuit substrate which includes an addressing circuit and a plurality of first addressing electrodes;
  forming a plurality of elastic electrode pillars on the circuit substrate;
  forming a vertical part of a second addressing electrode on the elastic electrode pillar, and forming a horizontal part of the second addressing electrode on the surface of the light-emitting element facing the circuit substrate;
  mounting the light-emitting element on the elastic electrode pillar so that the horizontal part of the second addressing electrode is connected to the vertical part of the second addressing electrode, the addressing circuit is configured to provide a first electrostatic voltage to the first addressing electrode and a second electrostatic voltage to the second addressing electrode; the first electrostatic voltage and the second electrostatic voltage are configured to control the deflection angle of the elastic electrode pillar.

In an exemplary embodiment, forming a plurality of elastic electrode pillars on the circuit substrate includes: forming a first elastic electrode pillar; forming a first elastic insulating layer wrapping the first elastic electrode pillar; forming a second elastic electrode pillar wrapping the first elastic insulating layer; and forming a second elastic insulating layer wrapping the second elastic electrode pillar.

In an exemplary embodiment, the light-emitting element includes a first electrode and a second electrode, and mounting the light-emitting element on the elastic electrode pillar includes: coating conductive adhesive on the surfaces of the first elastic electrode pillar and the second elastic electrode pillar; transferring the light-emitting element to the elastic electrode pillar, allowing the horizontal part of the second addressing electrode to e connected with the vertical part of the second addressing electrode, allowing the first electrode to be aligned and connected with the first elastic electrode pillar through the conductive adhesive, and allowing the second electrode to be aligned and connected with the second elastic electrode pillar through the conductive adhesive; and heating up the conductive adhesive to fix the light-emitting element.

An embodiment of the disclosure further provides a driving method for a display substrate applied to any one of the aforementioned display substrates, which includes:

the addressing circuit provides a first electrostatic voltage to the first addressing electrodes and a second electrostatic voltage to the second addressing electrodes; when the display mode is in 2D, the polarities of the first electrostatic voltage of the first addressing electrodes and the second electrostatic voltage of the second addressing electrodes are the same; when the display mode is in 3D, the polarity of the first electrostatic voltage of some of the plurality of first addressing electrodes is the same as the polarity of the second electrostatic voltage of the second addressing electrode, while the polarity of the first electrostatic voltage of the other first addressing electrodes is different from the polarity of the second electrostatic voltage of the second addressing electrode.

In an exemplary embodiment, when the display mode is in 2D, the first electrostatic voltage of the first addressing electrodes and the second electrostatic voltage of the second addressing electrodes are all positive voltages;

when the display mode is in 3D, the first electrostatic voltage of some of the first addressing electrodes are positive voltages, the first electrostatic voltage of the other first addressing electrodes are negative voltages, and the second electrostatic voltage of the second addressing electrodes are positive voltages.

In an exemplary embodiment, the light-emitting elements includes first light-emitting elements, second light-emitting elements, and third light-emitting elements; when the display mode is in 3D, for a viewpoint formed by any group of the first light-emitting element, the second light-emitting element, and the third light-emitting element in space, the calculation method of a best viewing distance H, a distance H1 from the 3D nearest viewing region to the best viewing region, and a distance H2 from the 3D furthest viewing region to the best viewing region are as follows:

calculating a deflection angle $\alpha_1$ of a first light-emitting element, a deflection angle $\alpha_2$ of a second light-emitting element and a deflection angle $\alpha_3$ of a third light-emitting element according to electrostatic force between the first addressing electrode and the second addressing electrode;

calculating a horizontal distance L1 from the center position of the first light-emitting element to the center position of the best viewing region, a horizontal distance L2 from the center position of the second light-emitting element to the center position of the best viewing region, a horizontal distance L3 from the center position of the third light-emitting element to the center position of the best viewing region, and the best viewing distance H:

$\tan \alpha_1 = b_1/a_1 = L_1/H;$ $\tan \alpha_2 = b_2/a_2 = L_2/H;$ $\tan \alpha_3 = b_3/a_3 = L_3/H;$ $L_2 - L_1 = 0.5 * c_1 + d_1 + 0.5 * c_2;$ $L_3 - L_2 = 0.5 * c_2 + d_2 + 0.5 * c_3;$ wherein c1 is a width of the first light-emitting element, c2 is a width of the second light-emitting element, and c3 is a width of the third light-emitting element; a1 is a horizontal width of the first light-emitting element, a2 is a horizontal width of the second light-emitting element, a3 is a horizontal width of the third light-emitting element, $\alpha_1$ is a deflection angle of the first light-emitting element, $\alpha_2$ is a deflection angle of the second light-emitting element, and $\alpha_3$ is a deflection angle of the third light-emitting element; b1 is a vertical height of the first light-emitting element, b2 is a vertical height of the second light-emitting element, and b3 is a vertical height of the third light-emitting element; d1 is a distance between the first light-emitting element and the second light-emitting element, and d2 is a distance between the second light-emitting element and the third light-emitting element.

Of course, an implementation of any product or method in the embodiments of the present disclosure does not need to achieve all the advantages mentioned above at the same time. Other features and advantages of the present disclosure will be set forth in the following embodiments of the description, and in part will become apparent from the embodiments of the description, or be learned by practice of the present disclosure. Purposes and other advantages of the technical schemes of the present disclosure may be achieved and acquired by structures specified in the detailed description and drawings.

After the drawings and the detailed descriptions are read and understood, the other aspects may be comprehended.

BRIEF DESCRIPTION OF DRAWINGS

The attached drawings are for providing a further understanding for technical schemes of the present disclosure and constitute a part of the description. They are for explaining the technical schemes of the present disclosure together with the embodiments of the present disclosure and do not constitute a limitation on the technical schemes of the present disclosure. The shape and size of each component in the drawings do not reflect true proportions and only to be used to schematically illustrate contents of the present disclosure.

DETAILED DESCRIPTION

Implementations of the present disclosure will be described further in detail below with reference to the accompanying drawings and embodiments. The following embodiments serve to illustrate the present disclosure, but are not intended to limit the scope of the present disclosure. The embodiments and features in the embodiments in the present disclosure may be combined randomly if there is no conflict.

3D display has gradually become popular in recent years, of which the main principle is to have the left eye and right eye of a viewer to receive different images. The left and right eye images are analyzed and overlapped by human brain, and the viewer can perceive the layering of the image, which produces a stereoscopic impression. Among them, naked eye 3D display technology is the research hotspot of 3D display technologies.

Naked eye 3D display technology mainly includes holographic 3D display technology, volume 3D display technology, Autostereoscopic 3D display technology and so on. Autostereoscopic 3D display technology has been considered as the naked eye 3D display technology likely to be soon commercialized for its capability to obtain dynamic, colorful and large viewing angle three-dimensional display effect. Autostereoscopic 3D display technology includes naked eye 3D display technology based on geometric optics, such as cylindrical lens array technology, parallax barrier technology, microlens array technology and so on. This kind of technology is mainly based on the principles of straight line propagation, reflection and refraction of light. Through structural design, the emitting direction of each pixel in the display screen may be changed, and image in each visual angle is projected at a different viewpoint position, so that people's left and right eyes may see different visual angle images that form a stereoscopic vision.

Figure 1:
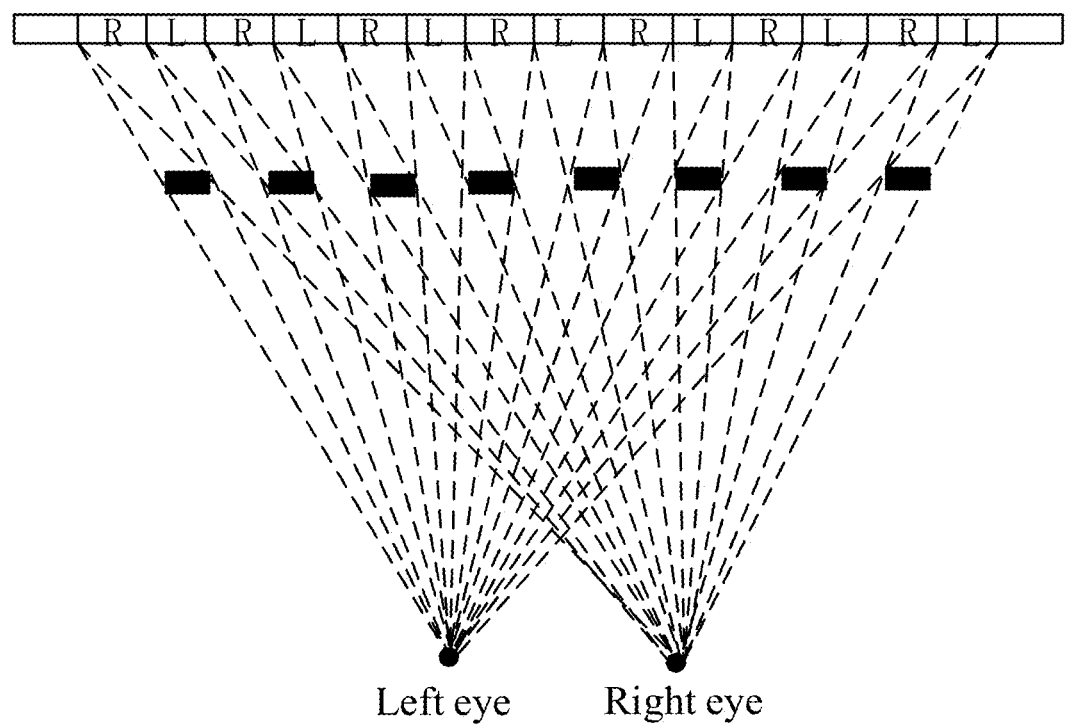
FIG. 1 is a schematic diagram of the principle of a naked eye 3D display according to an embodiment of the present disclosure.

Optical screens used for naked eye 3D display usually need to display multi-viewpoint images with parallax. A plurality of viewpoint images displayed on the screen are separated into different viewing regions by an optical separation component, and the viewer may only observe one viewpoint image in a certain viewing region. When the left and right eyes of the viewer are in two different viewing regions at the same time, the horizontal parallax between the left and right viewpoint images generates correct depth information by brain fusion. Naked eye stereoscopic display technology may draw multi-view images in an interweaved mode through spatial multiplexing. That is, a plurality of view images are first divided into a plurality of strip-shaped sub-images, and then merged into a single image through interweaving (selecting a part of strip-shaped sub-images from each view image in turn according to a certain rule) for stereoscopic display, as shown in FIG. 1.

Because the naked eye image formed by the conventional lenticular lens grating and slit grating may be only seen 3D images in a certain range of horizontal direction in front of the display screen, the visual impact is not enough to attract commercial application. Moreover, the lenticular lens grating and the slit grating block part of the light emitted by the display panel, which reduces the display brightness and display effect. Although through the current holographic technology, naked eye 3D images may be seen within 360 degrees, it is too demanding for equipment and technology, making it expensive and difficult to achieve, thus it cannot be widely used.

An embodiment of the present disclosure provides a display substrate, which includes a circuit substrate, a plurality of elastic electrode pillars disposed on the circuit substrate, a plurality of second addressing electrodes disposed on the plurality of elastic electrode pillars and a plurality of light-emitting elements disposed on the plurality of second addressing electrodes, wherein the circuit substrate includes an addressing circuit and a plurality of first addressing electrodes, wherein the addressing circuit is configured to provide a first electrostatic voltage to the first addressing electrodes and a second electrostatic voltage to the second addressing electrodes; wherein the first electrostatic voltage and the second electrostatic voltage are configured to control the deflection angle of the elastic electrode pillar.

According to the display substrate provided by the embodiment of the disclosure, the first electrostatic voltage is provided to the first addressing electrode and the second electrostatic voltage is provided to the second addressing electrode through the addressing circuit, and the first electrostatic voltage and the second electrostatic voltage are configured to control the deflection angle of the elastic electrode pillar, so that the light-emitting elements deflect towards the direction of the electrostatic attraction direction, and the light rays emitted by the light-emitting elements at different positions exit along different directions, and enter the left eye and/or the right eye, thereby achieving naked eye 3D display. In addition, the deflection direction of the elastic electrode pillar theoretically should be between 0 and 180 degrees, and the light emitted by the light-emitting element directly enters the human eye without passing through a grating, which overcomes many problems of the existing naked eye 3D display schemes, such as small observation range (relatively fixed longitudinal optimal viewing distance and few transverse viewing viewpoints), poor picture continuity and the like, improving the display brightness and display effect.

Figure 2:
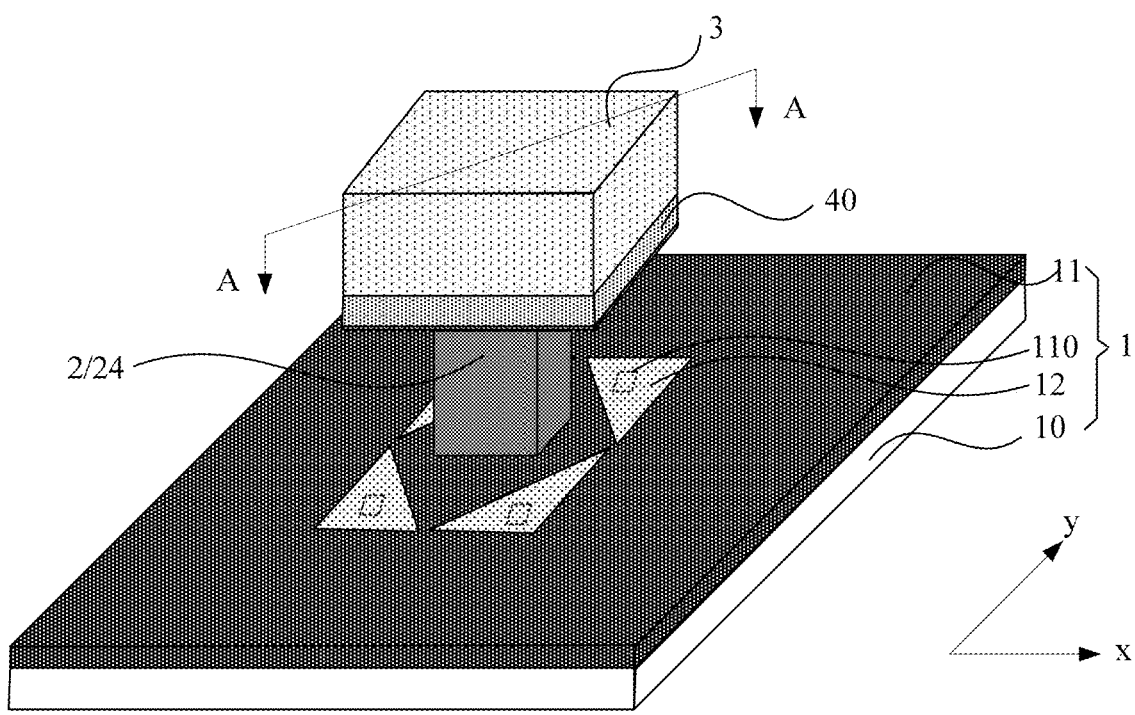
FIG. 2 is a schematic diagram of a plane structure of a display substrate according to an embodiment of the present disclosure.
Figure 3:
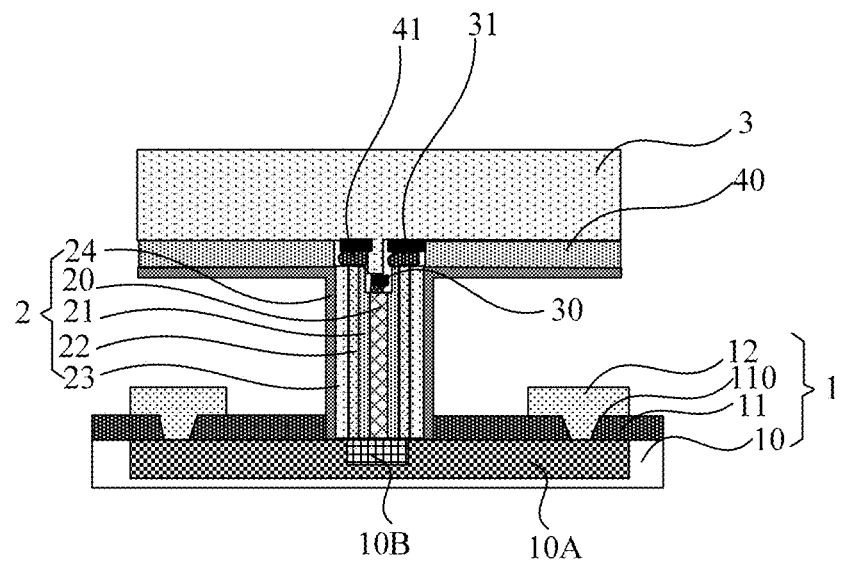
FIG. 3 is a schematic diagram of a cross-sectional structure of the display substrate shown in FIG. 2 in AA direction.

As shown in FIGS. 2 and 3, An embodiment of the present disclosure provides a display substrate, which includes a circuit substrate 1, a plurality of elastic electrode pillars 2 disposed on the circuit substrate 1, a plurality of second addressing electrodes 24 disposed on the elastic electrode pillars 2 and a plurality of light-emitting elements 3 disposed on the second addressing electrodes 24 (only one elastic electrode pillar 2 and one light-emitting element 3 are exemplarily shown in FIG. 2).

The circuit substrate 1 includes an addressing circuit 10A and a plurality of first addressing electrodes 12, wherein the addressing circuit 10A is configured to provide a first electrostatic voltage to the first addressing electrodes 12 and a second electrostatic voltage to the second addressing electrodes 24, and the first electrostatic voltage and the second electrostatic voltage are configured to control the deflection angle of the elastic electrode pillar 2.

In an exemplary embodiment, the light-emitting element 3 may be a Mini-LED chip, a Micro-LED chip, an organic LED or a quantum dot LED.

In an exemplary embodiment, the a plurality of light-emitting elements 3 are disposed in an array along a first direction x and a second direction y, the first direction x and the second direction y intersect; the intervals between two adjacent light-emitting elements 3 along the first direction x are equal, and the intervals between two adjacent light-emitting elements 3 along the second direction y are equal.

In an exemplary embodiment, a light-emitting element 3 includes a first light-emitting element 3A, a second light-emitting element 3B, and a third light-emitting element 3C.

Exemplarily, the first light-emitting element 3A, the second light-emitting element 3B, and the third light-emitting element 3C are one of a red (R) light-emitting element, a green (G) light-emitting element, and a blue (B) light-emitting element.

In an exemplary embodiment, an elastic electrode pillar 2 include a first elastic electrode pillar 20, a first elastic insulating layer 21 wrapping the first elastic electrode pillar 20, a second elastic electrode pillar 22 wrapping the first elastic insulating layer 21 and a second elastic insulating layer 23 wrapping the second elastic electrode pillar 22.

The light-emitting element 3 includes a first electrode 30 and a second electrode 31. The first electrode 30 is disposed on the top of the first elastic electrode pillar 20 and is connected to the first elastic electrode pillar 20, and the second electrode 31 is disposed on the top of the second elastic electrode pillar 22 and is connected to the second elastic electrode pillar 22.

In an exemplary embodiment, a circuit substrate 1 further includes a driver circuit 10B, which is connected to the first elastic electrode pillar 20 and the second elastic electrode pillar 22, and provides electroluminescent voltage to the light-emitting element 3 through the first elastic electrode pillar 20 and the second elastic electrode pillar 22.

Figure 4:
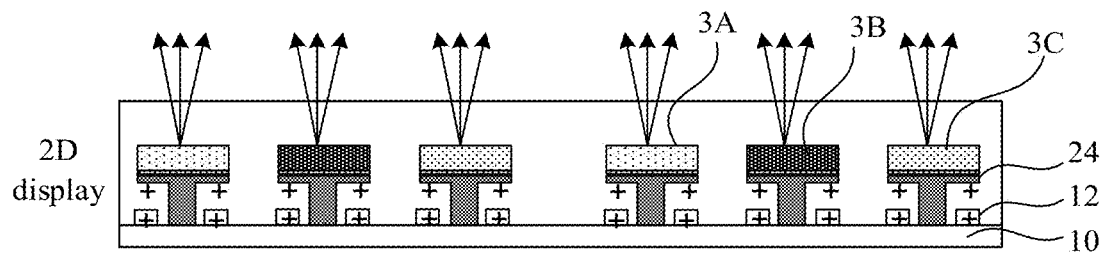
FIG. 4 is a schematic diagram of the principle of a 2D mode display of a display substrate according to an embodiment of the present disclosure.

In an embodiment of the present disclosure, as shown in FIG. 4, when the display mode is in 2D, the polarity of the first electrostatic voltage provided by the addressing circuit 10A to the plurality of first addressing electrodes 12 is the same as the polarity of the second electrostatic voltage provided by the addressing circuit 10A to the second addressing electrodes 24. At this time, due to the electrostatic repulsion occurs between identical polarities, the forces between the plurality of first addressing electrodes 12 and the second addressing electrodes 24 are the same, and the elastic electrode pillar 2 maintains a direction perpendicular to the display substrate.

Figure 5:
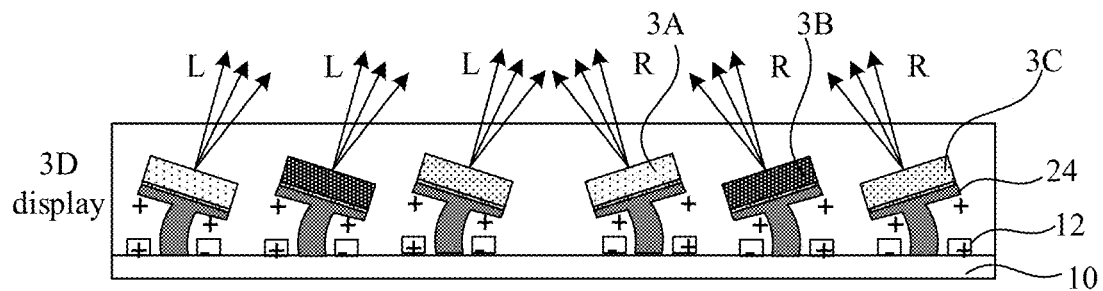
FIG. 5 is a schematic diagram of the principle of a 3D mode display of a display substrate according to an embodiment of the present disclosure.

In an embodiment of the present disclosure, as shown in FIG. 5, when the display mode is in 3D, the polarity of the first electrostatic voltage provided by the addressing circuit 10A to some of the first addressing electrodes 12 of the plurality of first addressing electrodes 12 is the same as the polarity of the second electrostatic voltage provided by the addressing circuit 10A to the second addressing electrodes 24, while the polarity of the first electrostatic voltage provided to the other part of the first addressing electrodes 12 of the plurality of first addressing electrodes 12 is different from the polarity of the second electrostatic voltage provided by the addressing circuit 10A to the second addressing electrodes 24. At this time, due to the principle that electrostatic repulsion occurs between identical polarities as well as the electrostatic attraction occurs between different polarities, an attractive force is generated between a part of the first addressing electrodes 12 and the second addressing electrodes 24, and a repulsive force is generated between the other part of the first addressing electrodes 12 and the second addressing electrodes 24. The elastic electrode pillar 2 deflects in the direction of the part of the first addressing electrode 12 that generates the attractive force.

For example, when the display mode is in 2D, the first electrostatic voltages provided by the addressing circuit 10A to the plurality of first addressing electrodes 12 are all positive voltages, and the second electrostatic voltages provided to the plurality of second addressing electrodes 24 are also all positive voltages.

When the display mode is in 3D, the first addressing voltages provided by the addressing circuit 10A to some of the first addressing electrodes 12 of the plurality of first addressing electrodes 12 are all positive voltages, the first addressing voltages provided to the other part of the first addressing electrodes 12 of the plurality of first addressing electrodes 12 are all negative voltages, and the second addressing voltages provided to the second addressing electrodes 24 are all positive voltages.

In this exemplary embodiment, first addressing electrodes 12 are distributed on the circuit substrate 1 located at the bottom of the light-emitting element 3, and second addressing electrodes 24 are distributed on one side of the light-emitting element 3 close to the circuit substrate 1. Static voltages are applied to the first addressing electrodes 12 and the second addressing electrodes 24 through the addressing circuit 10A to control the deflection direction of the light-emitting element 3. In 2D display, the first addressing electrode 12 and the second addressing electrode 24 corresponding to the light-emitting element 3 are applied with the same static voltage through the addressing circuit 10A, which generates electrostatic repulsion with the same magnitude. The posture of the light emitting element 3 is kept parallel to the display substrate and emits light upward. During 3D display, the camera system captures feedback on the position of the pupil of the left/right eye, which is achieved on one side of the light-emitting element 3 by the addressing circuit 10A. The first addressing electrode 12 and the second addressing electrode 24 are applied with the same electrostatic voltage that generates electrostatic repulsion; on the other side of the light-emitting element 3. The first addressing electrode 12 and the second addressing electrode 24 are applied with an electrostatic voltage of opposite polarities to generate electrostatic attraction, so that each light-emitting element 3 deflects toward the direction of electrostatic attraction. The light rays emitted by the light-emitting elements 3 at different positions exit along different directions, and enter the left eye and/or the right eye, thereby achieving naked eye 3D display. When the human eyes move, the camera system captures the feedback on the position, angle, speed and other information during the movement of the human eyes in real time, synchronously changes the static voltage in the first addressing electrode 12, continuously adjusts the deflection direction of each light-emitting element 3, and keeps the exit direction of the light emitted by each light-emitting element 3 changing with the position of the left/right eye, thus achieving naked eye 3D display with human eyes tracking.

In an exemplary embodiment, the light-emitting elements 3 correspond to the elastic electrode pillars 2 one by one.

In an exemplary embodiment, at least one of the elastic electrode pillars 2 of a plurality of elastic electrode pillars 2 corresponds to n first addressing electrodes 12 symmetrically distributed around the corresponding elastic electrode pillars 2, where n is a natural number greater than or equal to 4.

In an exemplary embodiment, the first elastic electrode pillar 20 may be a solid pillar or a hollow pillar.

In an exemplary embodiment, in a direction parallel to the display substrate, the cross-sectional shape of the first elastic electrode pillar 20 may be circular, regular triangle, regular polygon, etc.

In an exemplary embodiment, four first addressing electrodes 12 are disposed around each elastic electrode pillar 2.

In this embodiment, the larger the quantity of the first addressing electrodes 12 disposed around each elastic electrode pillar 2, the more accurate the deflection direction of the light-emitting element 3, hence the better the effect of achieving naked eye 3D display.

In an exemplary embodiment, a height of the first elastic electrode pillar 20 is smaller than that of the second elastic electrode pillar 22 to avoid short circuit between the first elastic electrode pillar 20 and the second elastic electrode pillar 22.

In an exemplary embodiment, a first electrode 30 is fixedly connected to the first elastic electrode pillar 20 through the conductive adhesive 41, and a second electrode 31 is fixedly connected to the second elastic electrode pillar 22 through the conductive adhesive 41.

In an exemplary embodiment, the second addressing electrode 24 includes a vertical part wrapping the second elastic insulating layer 23 and a horizontal part configured to support the light-emitting element 3.

One end of the vertical part is connected to the first power supply electrode, and the other end is connected to the horizontal part.

The horizontal part includes a first opening exposing the first elastic electrode pillar 20 and the second elastic electrode pillar 22.

In an exemplary embodiment, the second addressing electrode 24 on each elastic electrode pillar may be an entire body or may be composed of a plurality of independent second addressing electrodes 24.

An insulating layer 40 is provided between the light-emitting element 3 and the horizontal part.

In an exemplary embodiment, the orthographic projection of the second elastic electrode pillar 22 on the circuit substrate 1 is not overlapped with the orthographic projection of the second addressing electrode 24 on the circuit substrate 1, and the orthographic projection of the second electrode 31 on the circuit substrate 1 does not overlap with the orthographic projection of the second addressing electrode 24 on the circuit substrate 1. The overlapping area between the second elastic electrode pillar 22 and the second addressing electrode 24 shall be as small as possible, and the overlapping area between the second electrode 31 and the second addressing electrode 24 shall also be as small as possible to avoid mutual interference because of capacitive coupling.

In an exemplary embodiment, the first elastic electrode pillar 20 and the first electrode 30 are anodes, and the second elastic electrode pillar 22 and the second electrode 31 are cathodes; or, the first elastic electrode pillar 20 and the first electrode 30 are cathodes, and the second elastic electrode pillar 22 and the second electrode 31 are anodes.

When the display mode is in 3D, the first addressing voltages provided by the addressing circuit 10A to some of the first addressing electrodes 12 of a plurality of the first addressing electrodes 12 are all positive voltages, the first addressing voltages provided to the other part of the first addressing electrodes 12 of the plurality of the first addressing electrodes 12 are all negative voltages, and the second addressing voltages provided to the plurality of second addressing electrodes 24 are all positive voltages. The naked eyes 3D display effect of parallax 3D or light field display may be achieved by controlling different deflection angles of light-emitting elements to form different viewpoints.

In an exemplary embodiment, during 3D display, a best viewing distance H, a distance H1 from the nearest 3D viewing region to the best viewing region, and a distance H2 from the farthest 3D viewing region to the best viewing region may be calculated as follows:

calculating a deflection angle α1 of the first light-emitting element, a deflection angle α2 of the second light-emitting element and a deflection angle α3 of the third light-emitting element according to electrostatic force between the first addressing electrode 12 and the second addressing electrode 24; wherein, the electrostatic force between the first addressing electrode 12 and the second addressing electrode 24 satisfies the formula for calculating the force between plates of the plate capacitor:

$$F = \frac{1}{2} * \frac{\varepsilon_r \varepsilon_0 A V^2}{d^2};$$

In which $\varepsilon_r$ is the relative dielectric constant of medium, $\varepsilon_0$ is the vacuum dielectric constant, A is the area of a part of the first addressing electrode 12 directly opposite the second addressing electrode 24, V is the voltage difference between the first addressing electrode 12 and the second addressing electrode 24, and d is the vertical distance between the first addressing electrode 12 and the second addressing electrode 24.

Figure 6:
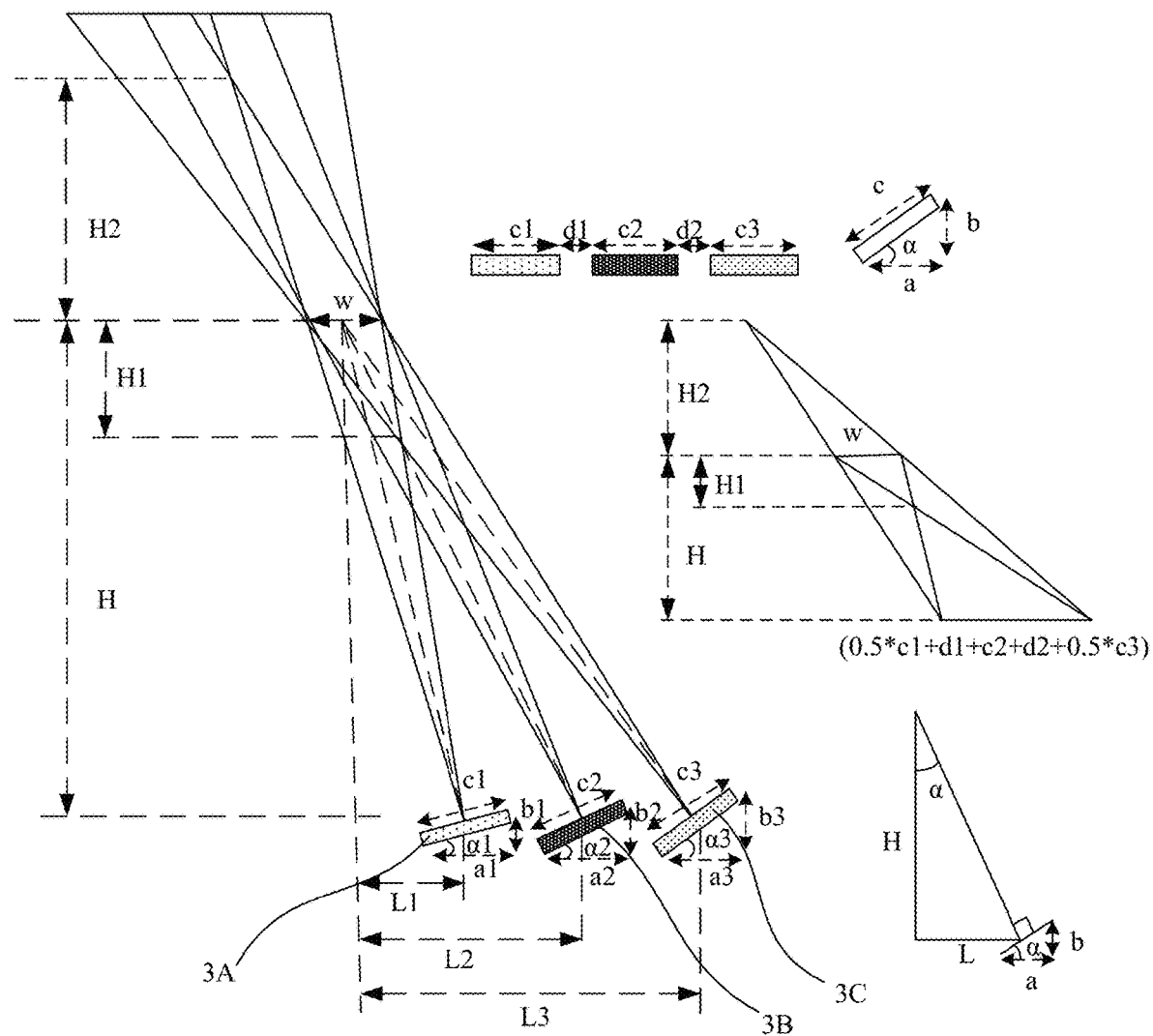
FIG. 6 is a schematic diagram of the calculation principle of the optimal viewing distance of the display substrate according to the embodiment of the present disclosure.

In some embodiments, for any group of RGB light-emitting elements controlled by the addressing circuit, the calculation method of forming a viewpoint may be expressed as follows: it may be considered that the displacement of RGB light-emitting elements after deflection is smaller than the optimal viewing distance H, and the horizontal distances L1, L2, L3 from the center position of RGB light-emitting elements to the center position of the optimal viewing region. It may still be approximately regarded that the center positions of the RGB light-emitting elements are on the same horizontal line, and a connecting line between the center position of the best viewing region and the center position of the light-emitting elements is perpendicular to the light-emitting elements. As shown in FIG. 6, the horizontal distances L1, L2, L3 from the center positions of different RGB light-emitting elements to the center position of the best viewing region and the best viewing distance H are calculated according to the following formula:

$$\tan \alpha 1 = b1/a1 = L1/H;$$

$$\tan \alpha 2 = b2/a2 = L2/H;$$

$$\tan \alpha 3 = b3/a3 = L3/H;$$

$$L2-L1=0.5*c1+d1+0.5*c2;$$

$$L3-L2=0.5*c2+d2+0.5*c3.$$

In which c1, c2 and c3 are the widths of different RGB light-emitting elements; a1, a2 and a3 are horizontal widths of different RGB light-emitting elements, and α1, α2 and α3 are deflection angles of different RGB light-emitting elements; b1, b2 and b3 are vertical heights of different RGB light-emitting elements; d1 is the space of RG light-emitting elements; d2 is the space of GB light-emitting elements.

When the diffusion angle of the light emitted from RGB light-emitting elements is constant, based on the principle of similar triangles, the distance H1 from the nearest 3D viewing region to the best viewing region, and the distance H2 from the farthest 3D viewing region to the best viewing region are calculated:

$$w/(0.5*c1+d1+c2+d2+0.5*c3)=H1/(H-H1)=H2/(H+H2);$$

wherein, w is the width of the best viewing region in the horizontal direction, that is, the maximum width of the region where the light emitted by RGB light-emitting elements all overlap in the horizontal direction.

The technical solution is further described below through a process for preparing the display substrate in the present embodiment. A "patterning process" mentioned in the present embodiment includes processes such as deposition of a film layer, coating of photoresist, mask exposure, development, etching, stripping of photoresist, etc., and is a mature manufacturing process. Deposition may be performed by using a known process such as sputtering, evaporation, chemical vapor deposition, or the like, coating may be performed by using a known coating process, and etching may be performed by using a known approach, which are not limited here.

The entire preparation process of the display substrate of this embodiment mainly includes four parts: forming a circuit substrate 1, forming an elastic electrode pillar on the circuit substrate 1, forming a second addressing electrode 24, and mounting a light-emitting element 3. The following describes the four-part processing steps.

1. Forming the Circuit Board 1

(11) Forming an addressing circuit 10A and a driver circuit 10B on the substrate 10. In an exemplary embodiment, each light-emitting element 3 corresponds to a driver circuit 10B and an addressing circuit 10A. The driver circuit 10B is configured to provide electroluminescence voltage to the light-emitting element 3, and the addressing circuit 10A is configured to provide electrostatic voltage to a first addressing electrode 12 and a second addressing electrode 24.

In an exemplary embodiment, the driver circuit 10B can be disposed directly underneath each light-emitting element 3, and the addressing circuit 10A is disposed around the driver circuit 10B.

In an exemplary embodiment, the addressing circuit 10A and the driver circuit 10B may be formed by a complementary metal oxide semiconductor (CMOS) process in an integrated circuit process.

Figure 7:
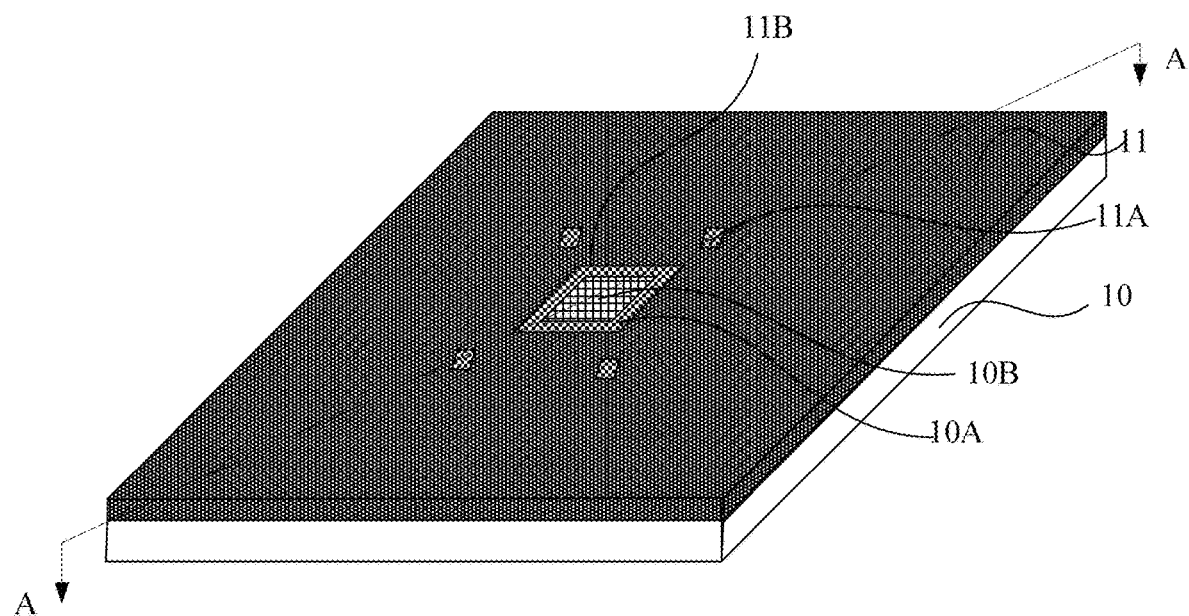
FIG. 7 is a schematic diagram of a display substrate after an insulation protection layer is formed according to an embodiment of the present disclosure.
Figure 8:
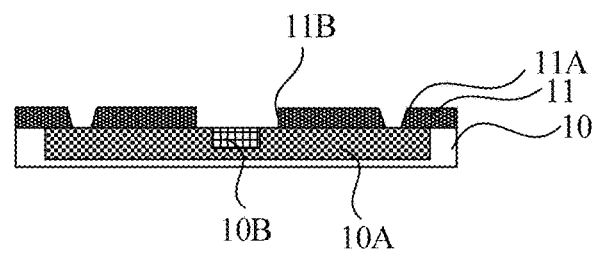
FIG. 8 is a schematic diagram of a cross-sectional structure of the display substrate shown in FIG. 7 in AA direction.

(12) Depositing an insulating protection film, patterning the insulating protection film through a patterning process to form a pattern of an insulating protection layer 11 provided with a plurality of first vias 11A and second vias 11B on the substrate 10 on which the addressing circuit 10A and the driver circuit 10B are formed, as shown in FIGS. 7 and 8. The insulating protection layer 11 is provided with a plurality of first vias 11A and at least one second via 11B. The positions of the plurality of first vias 11A correspond to the positions of the first addressing electrodes 12 formed subsequently, and the position of the second via 11B corresponds to the position of the elastic electrode pillar 2 formed subsequently. The insulating protection layer 11 in the plurality of first vias 11A is etched away, exposing part of the surface of the addressing circuit 10A, and the insulating protection layer 11 in the second via 11B is etched away, exposing the driver circuit 10B and part of the surface of the addressing circuit 10A.

Figure 9:
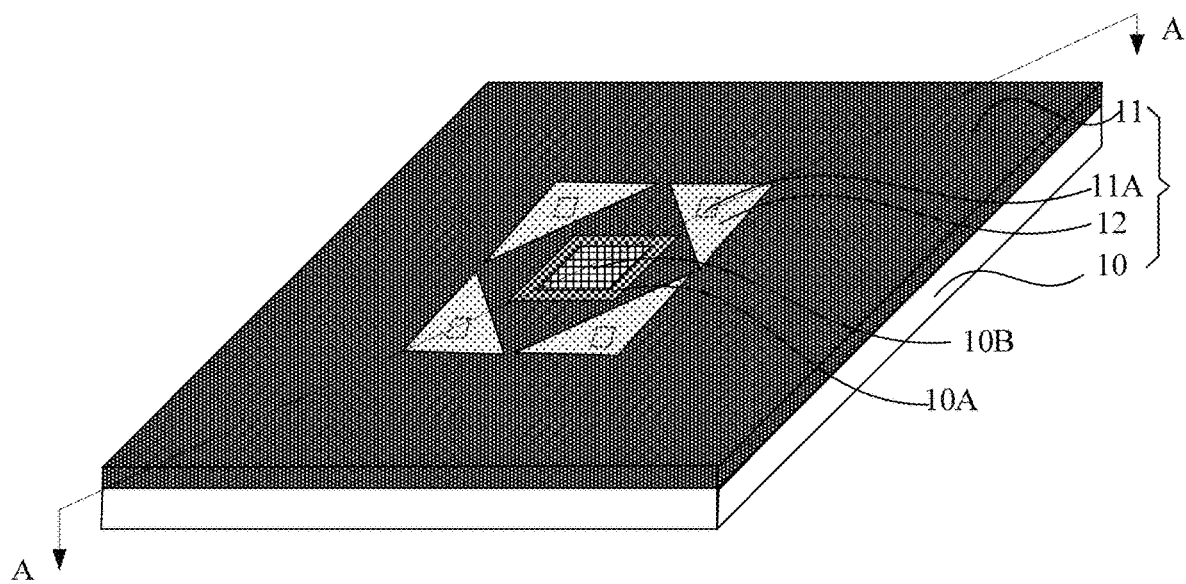
FIG. 9 is a schematic diagram of a display substrate after a first addressing electrode is formed according to an embodiment of the present disclosure.
Figure 10:
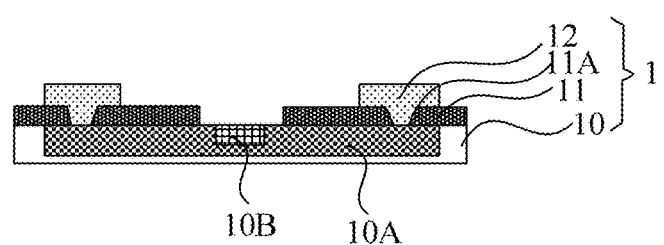
FIG. 10 is a schematic diagram of a cross-sectional structure of the display substrate shown in FIG. 9 in AA direction.

(13) Depositing a first metal film on the substrate 10 on which the pattern of the aforementioned insulating protection layer 11 is formed, and forming a plurality of first addressing electrodes 12 on the plurality of first vias 11A through a patterning process, as shown in FIGS. 9 and 10.

The preparation of the circuit substrate 1 of this embodiment is completed through the above process.

2. Forming an Elastic Electrode Pillar 2 on the Circuit Substrate 1

Figure 11:
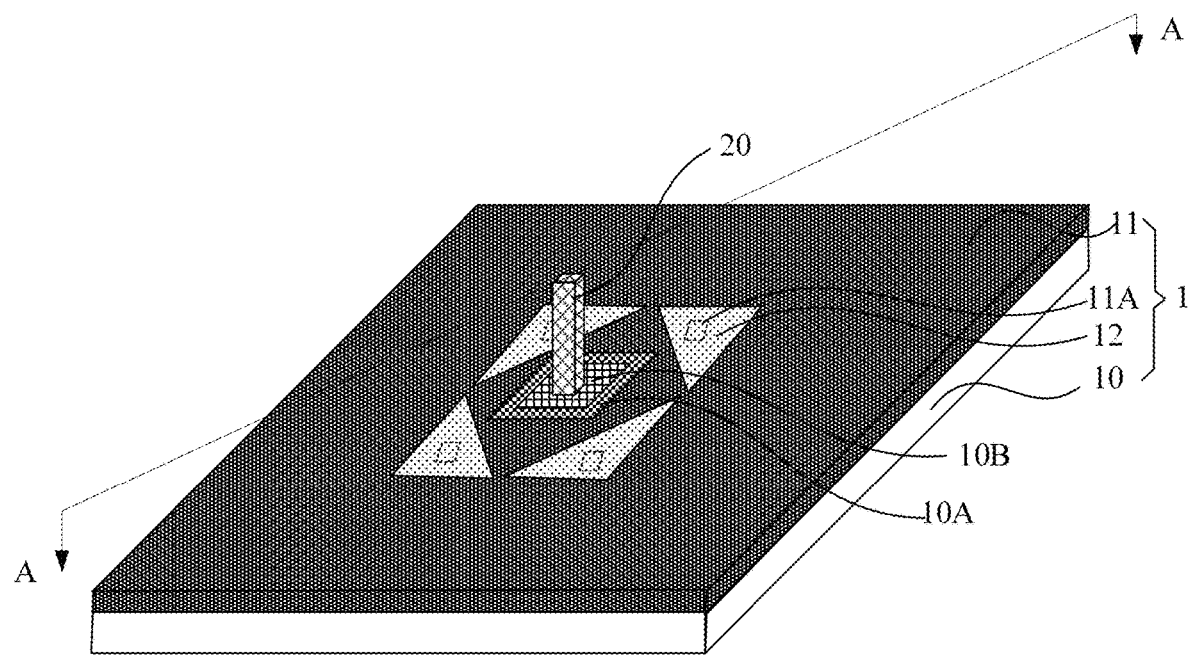
FIG. 11 is a schematic diagram of a display substrate after a first elastic electrode pillar is formed according to an embodiment of the present disclosure.
Figure 12:
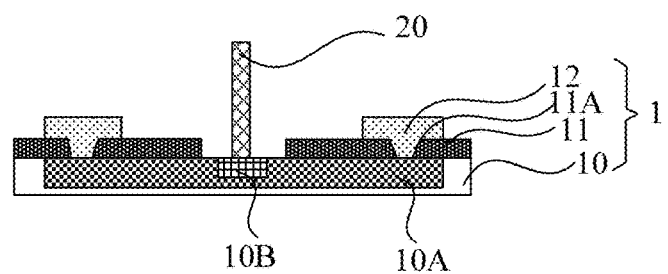
FIG. 12 is a schematic diagram of a cross-sectional structure of the display substrate shown in FIG. 11 in AA direction.

(21) Forming a first elastic electrode pillar 20 on the circuit substrate 1, and the bottom of the first elastic electrode pillar 20 is connected to the driver circuit 10B, and the driver circuit 10B is configured to provide a first driving voltage for the first elastic electrode pillar 20, as shown in FIGS. 11 and 12.

In an exemplary embodiment, a first elastic electrode pillar 20 may be formed through a patterning process.

In another exemplary embodiment, the first elastic electrode pillar 20 may alternatively be formed through electroforming or electroplating, which is not limited in the present disclosure.

Figure 13:
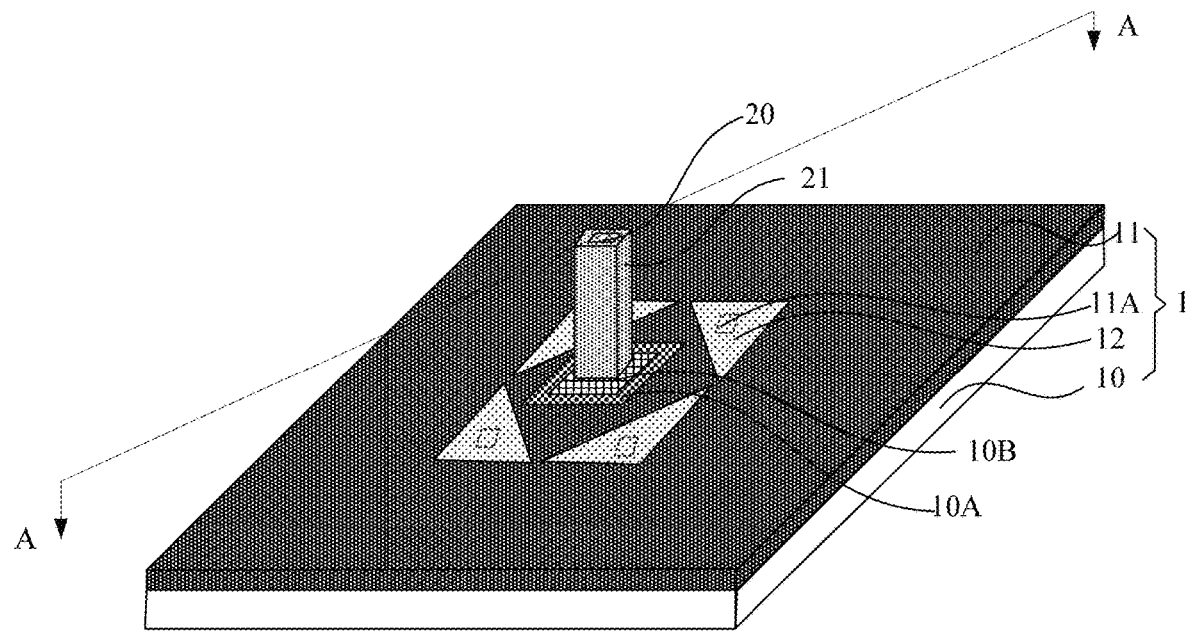
FIG. 13 is a schematic diagram of a display substrate after a first elastic insulating layer is formed according to an embodiment of the present disclosure.
Figure 14:
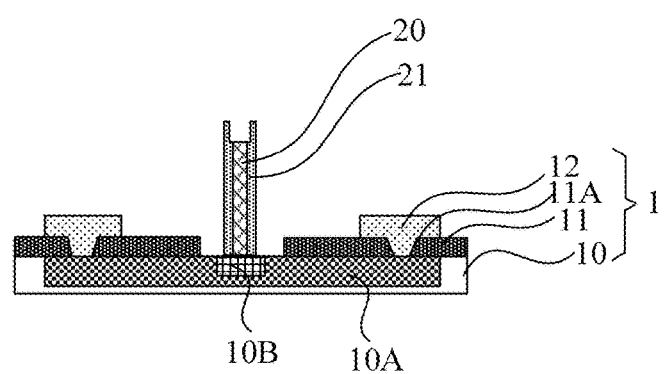
FIG. 14 is a schematic diagram of a cross-sectional structure of the display substrate shown in FIG. 13 in AA direction.

(22) Depositing a first elastic insulating film, patterning the first elastic insulating film through a patterning process to form a first elastic insulating layer 21 wrapping the first elastic electrode pillar 20 on the periphery of the first elastic electrode pillar 20, as shown in FIGS. 13 and 14.

Figure 15:
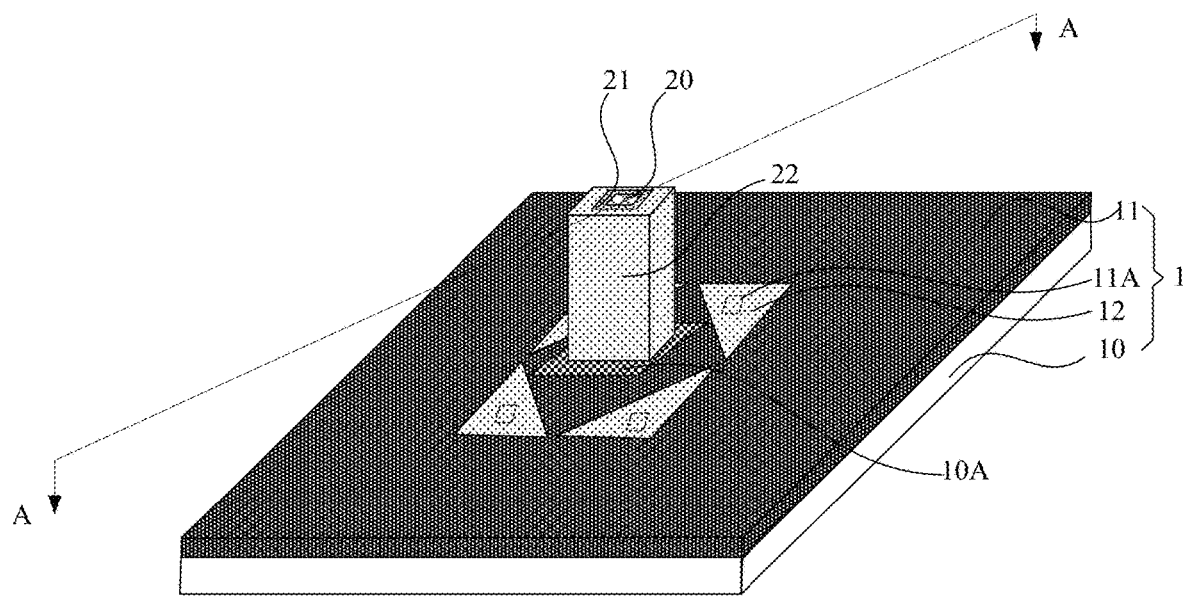
FIG. 15 is a schematic diagram of a display substrate after a second elastic electrode pillar is formed according to an embodiment of the present disclosure.
Figure 16:
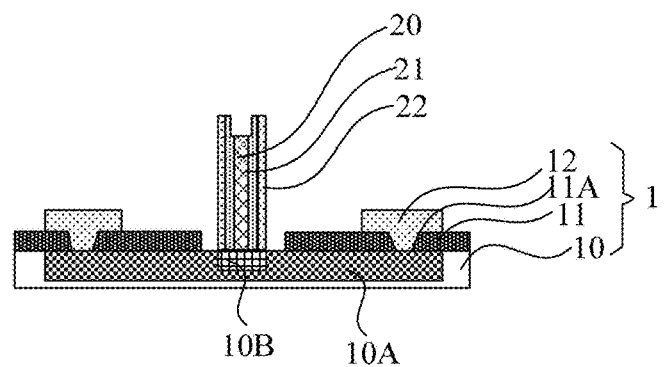
FIG. 16 is a schematic diagram of a cross-sectional structure of the display substrate shown in FIG. 15 in AA direction.

(23) Depositing a second elastic metal film, patterning the second elastic metal film through a patterning process to form a second elastic electrode pillar 22 wrapping the first elastic insulating layer 21 on the periphery of the first elastic insulating layer 21, wherein the bottom of the second elastic electrode pillar 22 is connected to a driver circuit 10B, and the driver circuit 10B is configured to provide a second driving voltage to the second elastic electrode pillar 22, as shown in FIGS. 15 and 16.

In an exemplary embodiment, a height difference of a preset distance may be set between the second elastic electrode pillar 22 and the first elastic electrode pillar 20 to avoid short circuit between the second elastic electrode pillar 22 and the first elastic electrode pillar 20.

Figure 17:
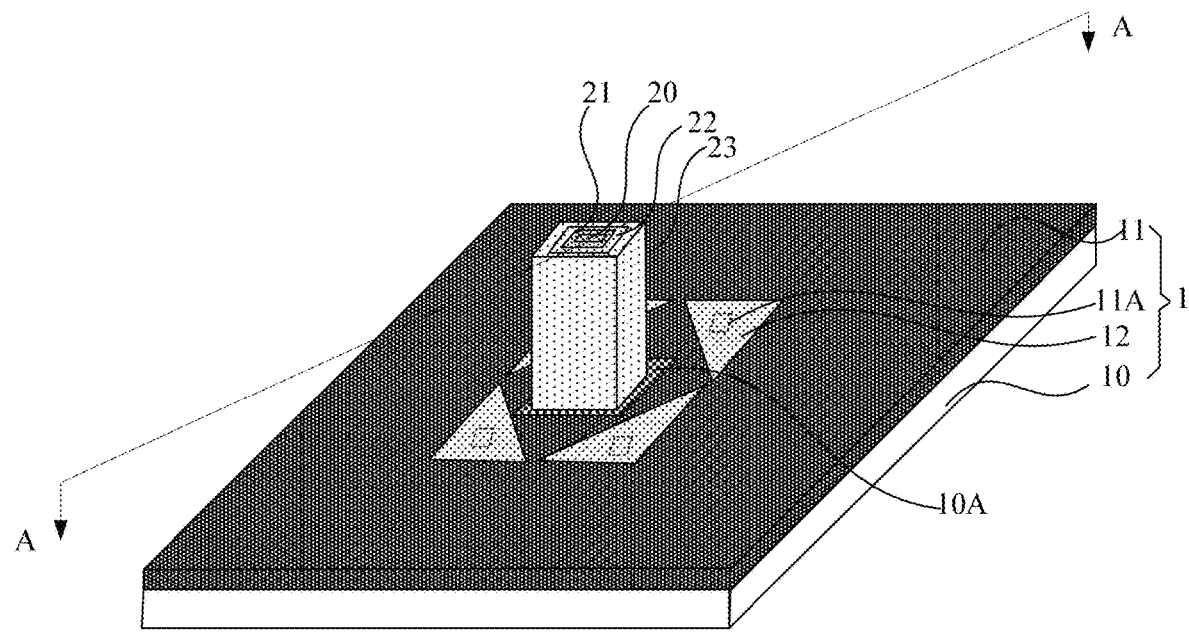
FIG. 17 is a schematic diagram of a display substrate after a second elastic insulating layer is formed according to an embodiment of the present disclosure.
Figure 18:
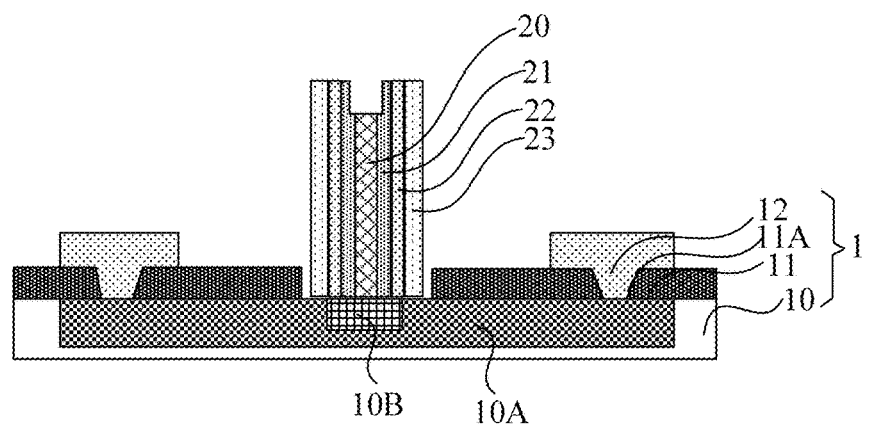
FIG. 18 is a schematic diagram of a cross-sectional structure of the display substrate shown in FIG. 17 in AA direction.

(24) Depositing a second elastic insulating film, patterning the second elastic insulating film through a patterning process, and forming a second elastic insulating layer 23 wrapping the second elastic electrode pillar 22 on the periphery of the second elastic electrode pillar 22, as shown in FIGS. 17 and 18.

At this point, the preparation of the elastic electrode pillar 2 in this embodiment is completed.

3. Forming a Second Addressing Electrode 24

Figure 19:
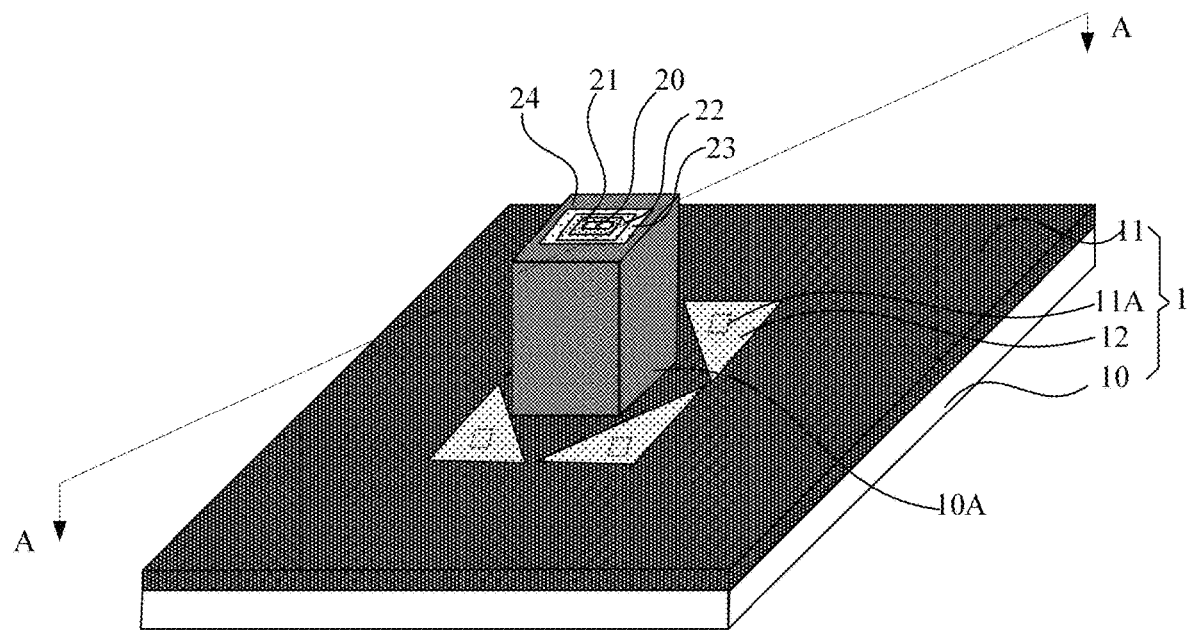
FIG. 19 is a schematic diagram of a display substrate after a vertical part of a second addressing electrode is formed according to an embodiment of the present disclosure.
Figure 20:
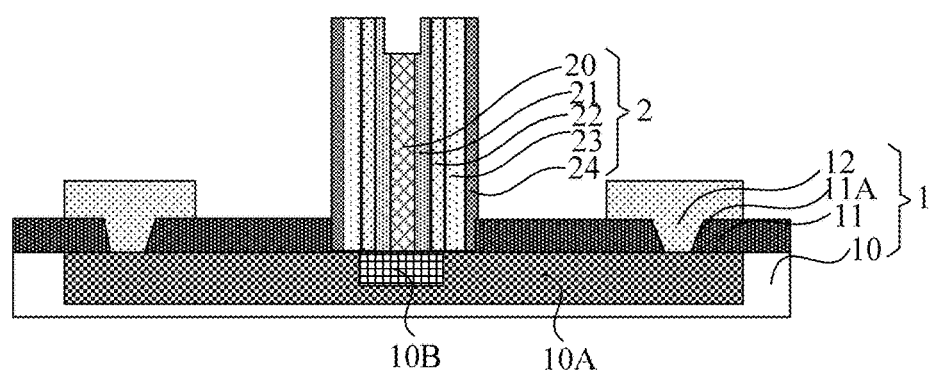
FIG. 20 is a schematic diagram of a cross-sectional structure of the display substrate shown in FIG. 19 in AA direction.

(31) Depositing a third elastic metal film, patterning the third elastic metal film through a patterning process to form a vertical part of the second addressing electrode 24 wrapping the second elastic insulating layer 23 on the periphery of the second elastic insulating layer 23, as shown in FIGS. 19 and 20.

(32) Preparing a horizontal part of the second addressing electrode 24 on the surface of the light-emitting element 3 facing the circuit board 1. An insulating layer 40 may be provided between the horizontal part of the second addressing electrode 24 and the surface of the light emitting element 3 facing the circuit substrate 1.

In some embodiments, the horizontal part of the second addressing electrode 24 may be a metal platform, which is configured to carry the light-emitting element 3. The center is hollowed out, which is used for the first electrode 30 of the flip-chip light-emitting element 3 to be connected to the first elastic electrode pillar 20, and for the second electrode 31 of the flip-chip light-emitting element 3 to be connected to the second elastic electrode pillar 22.

In this embodiment, the horizontal part of the second addressing electrode 24 may be made of high-reflectivity metal, which can emit the light emitted by the light-emitting element 3 upward to enhance the display effect in one aspect, and can electrostatically actuate deflection to achieve the naked eye 3D display effect in another aspect.

4. Mounting the Light-Emitting Element 3

As shown in FIGS. 2 and 3, coating the thermosetting conductive adhesive 41 on the surfaces of the first elastic electrode pillar 20 and the second elastic electrode pillar 22; then transferring the flip-chip light-emitting element 3 to the elastic electrode pillar 2; the horizontal part of the second addressing electrode is connected to the vertical part of the second addressing electrode, and the first electrode 30 of the light-emitting element 3 is precisely aligned and connected to the first elastic electrode pillar 20 through the thermosetting conductive glue 41, and the second electrode 31 of the light-emitting element 3 is precisely aligned and connected to the second elastic electrode pillar 22 through a thermosetting conductive glue 41; Then heating up the conductive glue 41 to have it fixed.

In this embodiment, the overlapping area between an orthographic projection of the second addressing electrode 24 on the circuit substrate 1 and an orthographic projection of the second electrode 31 of the light-emitting element 3 on the circuit substrate 1, as well as the overlapping area between an orthographic projection of the second addressing electrode 24 on the circuit substrate 1 and an orthographic projection of the second elastic electrode pillar 22 on the circuit substrate 1 shall be as small as possible to avoid mutual interference because of capacitive coupling In this embodiment, the light emitting element 3 may be a light-emitting diode (LED), which includes but is not limited to a Mini-LED, a Micro-LED, an organic LED, or a quantum dot LED.

In this embodiment, the driver circuit 10B applies different electroluminescent voltages to the first electrode 30 and the second electrode 31 of the flip-chip light-emitting element 3 through the first elastic electrode pillar 20 and the second elastic electrode pillar 22.

In an exemplary embodiment, both the first electrode 30 and the second electrode 31 are made of metal materials with high reflectivity to reflect light upwards.

Here, the preparation of the display substrate of this embodiment is completed.

It may be seen from the above preparation process that, in the embodiment of the present disclosure, the light-emitting elements 3 are disposed on the elastic electrode pillars 2, and the first addressing electrodes 12 and/or the second addressing electrodes 24 are disposed at the bottom and/or at four corners of the light-emitting elements 3, so that a plurality of light-emitting elements 3 can be correspondingly deflected according to the display mode, achieving naked eye 3D display.

According to the embodiments of the disclosure, the light-emitting elements deflect towards the electrostatic attraction direction due to the principle that the electrostatic repulsion occurs between identical polarities as well as the electrostatic attraction occurs between different polarities. The light rays emitted by the light-emitting elements at different positions enter the left eye and/or the right eye, display different pictures in the left and/or the right eye, and achieve naked eye 3D display based on the binocular parallax principle. When the human eye moves, the static voltages of the addressing electrodes are synchronously changed, so that the deflection direction of the light-emitting element may be continuously changed, achieving human eye tracking. The embodiment of the disclosure can switch 2D/3D display modes automatically, and overcome many problems of the existing naked eye 3D display schemes, such as small observation range (relatively fixed longitudinal optimal viewing distance and few transverse observation viewpoints), poor picture continuity and the like.

Currently, the display technology based on Mini-LED/Micro-LED is in the development stage. Mini-LED/Micro-LED is expected to become the next generation mainstream display technology for its advantages of small size, low power consumption and long product life. Because the preparation process of the display substrate according to the embodiments of the present disclosure may be achieved by using existing mature preparation devices, has small modification on the existing process, may be well compatible with the existing preparation process, and therefore has the advantages of simple process, easy to implement, high production efficiency, low production cost, and high yield. Therefore, the solution of this embodiment is a potential direction for future technological development and has good application prospects.

Figures 21, 22:
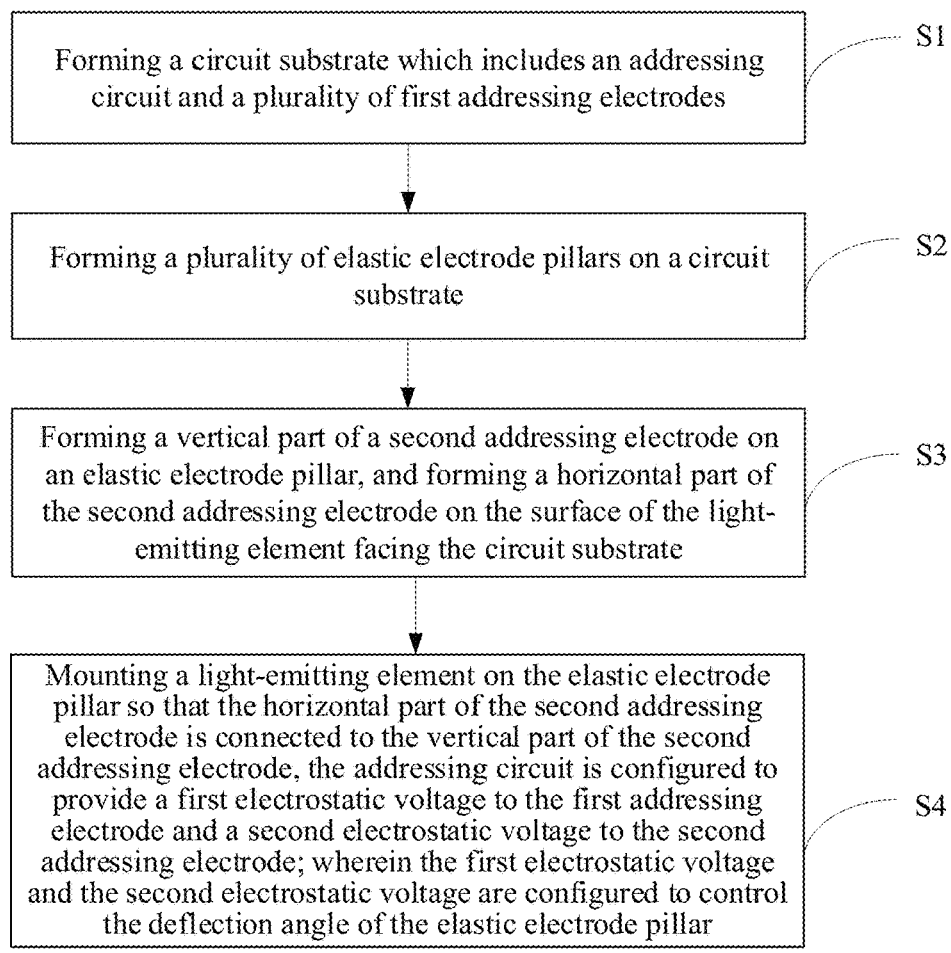
FIG. 21 is a schematic flowchart of a preparation method of a display substrate according to an embodiment of the present disclosure.
FIG. 22 is a schematic flowchart of a driving method of a display substrate according to an embodiment of the present disclosure.

An embodiment of the disclosure further provides a preparation method of a display substrate, which includes a circuit substrate, a plurality of elastic electrode pillars disposed on the circuit substrate and a plurality of light-emitting elements disposed on the elastic electrode pillars, wherein the light-emitting element includes a first electrode and a second electrode. As shown in FIG. 21, a method for preparing a display substrate in an embodiment of the present disclosure includes:

S1, forming a circuit substrate which includes an addressing circuit and a plurality of first addressing electrodes;

S2, forming a plurality of elastic electrode pillars on a circuit substrate;

S3, forming a vertical part of a second addressing electrode on an elastic electrode pillar, and forming a horizontal part of the second addressing electrode on the surface of the light-emitting element facing the circuit substrate;

S4, mounting a light-emitting element on the elastic electrode pillar so that the horizontal part of the second addressing electrode is connected to the vertical part of the second addressing electrode, the addressing circuit is configured to provide a first electrostatic voltage to the first addressing electrode and a second electrostatic voltage to the second addressing electrode; wherein the first electrostatic voltage and the second electrostatic voltage are configured to control the deflection angle of the elastic electrode pillar.

In an exemplary embodiment, an addressing circuit and a driver circuit are formed by a CMOS process.

In an exemplary embodiment, the first addressing electrode, the first elastic electrode pillar, the first elastic insulating layer, the second elastic electrode pillar, the second elastic insulating layer, the vertical part of the second addressing electrode and the horizontal part of the second addressing electrode are all formed by one-time patterning process.

In an exemplary embodiment, the first elastic electrode pillar may be formed through electroforming or electroplating process.

In an exemplary embodiment, forming a circuit substrate includes:

depositing an insulating protection film, and patterning the insulating protection film through a one-time patterning process to form an insulating protection layer provided with a plurality of first vias and second vias, wherein the positions of the first vias correspond to the positions of the first addressing electrodes and the positions of the second vias correspond to the positions of the elastic electrode pillars; the insulating protection layer of a plurality of first vias is etched away, exposing part of the surface of the addressing circuit, and the insulating protection layer of the second via is etched away, exposing the surface of the driver circuit and part of the addressing circuit;

depositing a layer of a first metal film, and forming a plurality of first addressing electrodes on the plurality of first vias through a patterning process.

In an exemplary embodiment, mounting a light-emitting element on an elastic electrode pillar includes:

coating conductive adhesive on the surfaces of a first elastic electrode pillar and a second elastic electrode pillar;

transferring the light-emitting element to the elastic electrode pillar, connecting a horizontal part of the second addressing electrode with a vertical part of the second addressing electrode, aligning and connecting the first electrode with the first elastic electrode pillar through the conductive adhesive, and aligning and connecting the second electrode with the second elastic electrode pillar through the conductive adhesive; and heating up the conductive adhesive to fix the light-emitting element.

An embodiment of present disclosure provides a manufacturing method for a display substrate, the light-emitting elements are disposed on the elastic electrode pillars, and the first addressing electrodes and the second addressing electrodes are disposed at the bottom and at four corners of the light-emitting elements, so that a plurality of light-emitting elements can correspondingly deflects according to the display mode, achieving naked eye 3D display.

An embodiment of the present disclosure provides a driving method of a display substrate including a circuit substrate, a plurality of elastic electrode pillars disposed on the circuit substrate, and a plurality of second addressing electrodes and a plurality of light-emitting elements disposed on the elastic electrode pillars. As shown in FIG. 22, a driving method for a display substrate in an embodiment of the present disclosure includes:

the addressing circuit provides a first electrostatic voltage to a plurality of first addressing electrodes and a second electrostatic voltage to a second addressing electrode; when the display mode is in 2D, the polarities of the first electrostatic voltages of the first addressing electrodes and the second electrostatic voltages of the second addressing electrodes are the same; when the display mode is in 3D, the polarities of the first electrostatic voltage of some of the first addressing electrodes of the plurality of first addressing electrodes are the same as that of the second electrostatic voltages of the second addressing electrodes, while the polarities of the first electrostatic voltage of the other first addressing electrodes are different from that of the second electrostatic voltages of the second addressing electrodes.

In an exemplary embodiment, when the display mode is in 2D, the first electrostatic voltages of the first addressing electrodes and the second electrostatic voltages of the second addressing electrodes are all positive voltages.

When the display mode is in 3D, the first electrostatic voltages of some of the first addressing electrodes of a plurality of the first addressing electrodes are positive voltages, the first electrostatic voltages of the other first addressing electrodes are negative voltages, and the second electrostatic voltages of the second addressing electrodes are positive voltages.

An embodiment of the present disclosure provides a driving method of a display substrate, in the method electrostatic voltages with different polarities for first addressing electrodes and second addressing electrodes are provided in a 2D mode and a 3D mode, so that a plurality of light-emitting elements may correspondingly deflect according to the display mode, thereby achieving naked eye 3D display.

An embodiment of the present disclosure further provides a display apparatus which includes display substrates of above embodiments. The display apparatus may be: any product or component with a display function, such as a mobile phone, a tablet computer, a television, a display, a laptop computer, a digital photo frame, or a navigator.

In the description of the present disclosure, it should be understood that an orientation or position relationship indicated by the terms "middle", "upper", "lower", "front", "rear", "vertical", "horizontal", "top", "bottom", "inner", "outer" and the like is based on the orientation or position relationship shown in the accompanying drawings, which is only for the convenience of describing the present disclosure and simplifying the description, rather than indicating or implying that the apparatus or element referred to must have the specific orientation, or be constructed and operated in the specific orientation, and thus cannot be interpreted as a limitation on the present disclosure.

In the descriptions of the embodiments of the disclosure, unless otherwise specified and limited, terms "mounting", "mutual connection" and "connection" should be generally understood. For example, the connection may be fixed connection or detachable connection or integral connection, the connection may be mechanical connection or electrical connection, and the connection may be direct connection or indirect connection through an intermediate or communication inside two elements. Those of ordinary skills in the art may understand meanings of the above terms in the present disclosure according to a situation.

Although the implementation modes of the present disclosure are disclosed above, the contents are only implementation modes adopted to easily understand the present disclosure and not intended to limit the present disclosure. Those skilled in the art may make any modifications and variations to implementation forms and details without departing from the spirit and scope disclosed by the present disclosure. However, the patent protection scope of the present disclosure should also be subject to the scope defined by the appended claims.

We claim:

1. A display substrate, comprising:
a circuit substrate, a plurality of elastic electrode pillars disposed on the circuit substrate, and a plurality of second addressing electrodes and a plurality of light-emitting elements disposed on the plurality of elastic electrode pillars, wherein
the circuit substrate comprises an addressing circuit and a plurality of first addressing electrodes, wherein the addressing circuit is configured to provide a first electrostatic voltage to the first addressing electrodes and provide a second electrostatic voltage to the second addressing electrodes, and the first electrostatic voltage and the second electrostatic voltage are configured to control a deflection angle of the elastic electrode pillars.

2. The display substrate of claim 1, wherein at least one elastic electrode pillar of the plurality of elastic electrode pillars corresponds to n first addressing electrodes symmetrically distributed around corresponding elastic electrode pillars, where n is a natural number greater than or equal to 4.

3. The display substrate of claim 1, wherein the plurality of light-emitting elements are disposed in an array along a first direction and a second direction, the first direction and the second direction intersect; intervals between two adjacent light-emitting elements along the first direction are equal, and intervals between two adjacent light-emitting elements along the second direction are equal.

4. The display substrate of claim 1, wherein each elastic electrode pillar comprises a first elastic electrode pillar, a first elastic insulating layer wrapping the first elastic electrode pillar, a second elastic electrode pillar wrapping the first elastic insulating layer and a second elastic insulating layer wrapping the second elastic electrode pillar;
each light-emitting element comprises a first electrode and a second electrode, wherein the first elastic electrode pillar is connected to the first electrode, and the second elastic electrode pillar is connected to the second electrode.

5. The display substrate of claim 4, wherein a height of the first elastic electrode pillar is smaller than a height of the second elastic electrode pillar.

6. The display substrate of claim 4, wherein the first electrode is disposed on the top of the first elastic electrode pillar and is fixedly connected to the first elastic electrode pillar through conductive adhesive, and the second electrode is disposed on the top of the second elastic electrode pillar and is fixedly connected to the second elastic electrode pillar through conductive adhesive.

7. The display substrate of claim 4, wherein each second addressing electrode comprises a vertical part and a horizontal part, and the vertical part is disposed to wrap a second elastic insulating layer; one end of the vertical part is connected to the addressing circuit and the other end is connected to the horizontal part;
the horizontal part comprises a first opening exposing the first elastic electrode pillar and the second elastic electrode pillar; and
an insulating layer is provided between the light-emitting element and the horizontal part.

8. The display substrate of claim 4, wherein the first elastic electrode pillar and the first electrode are anodes, and the second elastic electrode pillar and the second electrode are cathodes; or, the first elastic electrode pillar and the first electrode are cathodes, and the second elastic electrode pillar and the second electrode are anodes.

9. The display substrate of claim 1, wherein a light-emitting element is a Mini-LED chip, a Micro-LED chip, an organic light-emitting diode or a quantum dot light-emitting diode.

10. A display apparatus, comprising:
a circuit substrate, a plurality of elastic electrode pillars disposed on the circuit substrate, and a plurality of second addressing electrodes and a plurality of light-emitting elements disposed on the plurality of elastic electrode pillars, wherein
the circuit substrate comprises an addressing circuit and a plurality of first addressing electrodes, wherein the addressing circuit is used to provide a first electrostatic voltage to the first addressing electrodes and a second electrostatic voltage to the second addressing electrodes, and the first electrostatic voltage and the second electrostatic voltage are used to control a deflection angle of the elastic electrode pillars.

11. A preparing method for a display substrate, comprising:
forming a circuit substrate which comprises an addressing circuit and a plurality of first addressing electrodes;
forming a plurality of elastic electrode pillars on the circuit substrate;
forming a vertical part of a second addressing electrode on each elastic electrode pillar, and forming a horizontal part of the second addressing electrode on a surface of each light-emitting element facing the circuit substrate; and
mounting the light-emitting element on the elastic electrode pillar to allow the horizontal part of the second addressing electrode to be connected to the vertical part of the second addressing electrode, the addressing circuit is configured to provide a first electrostatic voltage to the first addressing electrodes and provide a second electrostatic voltage to the second addressing electrode; the first electrostatic voltage and the second electrostatic voltage are configured to control a deflection angle of the elastic electrode pillar.

12. The preparation method of claim 11, wherein forming the plurality of elastic electrode pillars on the circuit substrate comprises:
forming a first elastic electrode pillar;
forming a first elastic insulating layer wrapping the first elastic electrode pillar;
forming a second elastic electrode pillar wrapping the first elastic insulating layer; and
forming a second elastic insulating layer wrapping the second elastic electrode pillar.

13. The preparation method of claim 12, wherein the light-emitting element comprises a first electrode and a second electrode, and mounting the light-emitting element on the elastic electrode pillar comprises:

coating conductive adhesive on surfaces of the first elastic electrode pillar and the second elastic electrode pillar;

transferring the light-emitting element to the elastic electrode pillar, allowing the horizontal part of the second addressing electrode to be connected with the vertical part of the second addressing electrode, allowing the first electrode to be aligned and connected with the first elastic electrode pillar through the conductive adhesive, and allowing the second electrode to be aligned and connected with the second elastic electrode pillar through the conductive adhesive; and heating up the conductive adhesive to fix the light-emitting element.

\* \* \* \* \*